United States Patent [19]

Adam et al.

[11] 4,021,497
[45] May 3, 1977

[54] PRODUCTION OF 2-ETHYLHEXANOL-(1) BY HYDROGENATION OF 2-ETHYLHEXEN-(2)-AL-(1)

[75] Inventors: Karl Adam, Ludwigshafen; Erich Haarer, Bad Durkheim, both of Germany

[73] Assignee: Badische Anilin- & Soda-Fabrik Aktiengesellschaft, Ludwigshafen (Rhine), Germany

[22] Filed: May 30, 1972

[21] Appl. No.: 257,536

Related U.S. Application Data

[63] Continuation-in-part of Ser. No. 860,435, Sept. 23, 1969, abandoned, which is a continuation-in-part of Ser. No. 647,204, June 19, 1967, abandoned.

[30] Foreign Application Priority Data

June 25, 1966  Germany .......................... 1269605

[52] U.S. Cl. .............................. 260/638 B; 252/437
[51] Int. Cl.² ......................................... C07C 29/14
[58] Field of Search ............................... 260/638 B

[56] References Cited

UNITED STATES PATENTS

| 2,750,429 | 6/1956 | DeNora et al. | 260/638 A |
| 2,753,366 | 7/1956 | Pistor | 260/638 A |
| 3,125,605 | 3/1964 | Buchner et al. | 260/638 A |
| 3,260,683 | 7/1966 | Endler | 260/638 A |
| 3,478,112 | 11/1969 | Adam et al. | 260/638 A |

FOREIGN PATENTS OR APPLICATIONS 1,269,605  6/1968  Germany ........................ 260/638 B Primary Examiner—Joseph E. Evans
Attorney, Agent, or Firm—Johnston, Keil, Thompson & Shurtleff

[57] ABSTRACT

An improved process for the production of 2-ethylhexanol-(1) which comprises contacting 2-ethylhexen-(2)-al-(1) in an inert solvent with hydrogen at pressures of 1 to 500 atmospheres gauge and at temperatures of 80° to 200° C in the presence of a hydrogenation catalyst consisting essentially of cobalt and/or nickel and of copper and manganese and 0.5 to 15% by weight calculated as phosphorus pentoxide and based on the metal content of said catalyst exclusive of support of pyrophosphoric acid or polyphosphoric acid in free form and/or in the form of at least one salt of said metals. The alcohol produced is used as a solvent or for the production of plasticizers for polyvinyl chloride.

3 Claims, No Drawings

PRODUCTION OF 2-ETHYLHEXANOL-(1) BY HYDROGENATION OF 2-ETHYLHEXEN-(2)-AL-(1)

This application is a continuation-in-part of application Ser. No. 860,435, filed Sept. 23, 1969, now abandoned, the latter being a continuation-in-part of application Ser. No. 647,204, filed June 19, 1967, also now abandoned.

This invention relates to a process for the production of saturated alcohols by hydrogenation of aldehydes in the presence of catalysts which in addition to nickel and/or cobalt contain copper and manganese.

The catalytic hydrogenation of aldehydes or ketones to form saturated alcohols under various conditions of pressure and temperature has been known for a long time. The catalysts used are the metals of groups I to VIII of the Periodic System and mixtures of the same conventionally used for hydrogenation, if desired with an addition of other catalysts, such as metal oxides, silicates or phosphates. The catalysts may be used either supported or unsupported and the hydrogenation may be carried out in the absence or presence of inert diluents. A process for the hydrogenation of carbonyl compounds is described in U.S. Pat. No. 2,983,734 in which Raney nickel containing 0.5 to 3% by weight of chromium is used. It is moreover known from German Printed Application No. 1,003,702 that aldehydes can be hydrogenated in two stages with catalysts which contain 5 to 30% by weight of copper, 3 to 20% by weight of nickel and 0 to 5% by weight of chromium oxide. In another process, described in German Printed Application No. 1,115,232, aldehydes are hydrogenated in two stages in the presence of catalysts containing nickel and cobalt and which have a nickel content of preferably less than 15%. Methods are also known from British patent specifications Nos. 938,028 and 906,527 in which copper catalysts and nickel catalysts are used in separate beds in the hydrogenation of aldehydes. According to another method described in British patent specification No. 907,166 the first catalyst bed consists of a copper catalyst and the second catalyst bed consists of a copper-nickel catalyst, the ratio of copper to nickel being from 5 : 1 to 20 : 1. The alcohols prepared by the abovementioned methods do not satisfy requirements as regards purity. Owing to the rapid decrease in activity of the catalysts, the hydrogenation proceeds only incompletely so that non-hydrogenated compounds and other impurities remain in the product and these cannot be completely removed by distillation. The impurities cause the alcohols to discolor during further use, for example for esterification.

It is an object of this invention to provide an improved process in which 2-ethylhexanol-(1) is obtained so pure that it does not discolor in further processing. It is another object of the invention to provide a process in which the catalysts used have a long life while retaining a constant high activity. It is further an object of the invention to provide a process in which high space-time yields are achieved.

These and other objects are achieved in accordance with this invention by contacting 2-ethylhexen-(2)-al-(1) in an inert solvent with hydrogen at superatmospheric pressure and elevated temperature in the presence of hydrogenation catalysts in a process which comprises the improvement of using hydrogenation catalysts consisting essentially of nickel and/or cobalt and of copper and manganese and 0.5 to 15% by weight, calculated as phosphorus pentoxide and based on the metal content of said catalyst exclusive of support, of pyrophosphoric or polyphosphoric acid in free form and/or in the form of at least one salt of said metals.

The hydrogenation is carried out at pressures of from 1 to 500 atmospheres gauge, preferably at pressures of from 200 to 400 atmospheres gauge. Temperatures of 80° to 200° C are advantageously used. Particularly good results are achieved by using temperatures of from 100° to 180° C.

It is advantageous to carry out the hydrogenation in the presence of an inert solvent. Suitable solvents are media which are inert under the reaction conditions, such as hydrocarbons, for example cyclohexane; or alcohols, such as ethanol and propanol. It is particularly advantageous to use as the diluent the 2-ethylhexanol-(1) formed in the hydrogenation.

The hydrogenation catalysts consist essentially of nickel and/or cobalt and copper and manganese and 0.5 to 15%, preferably 1 to 10% by weight, calculated as phosphorus pentoxide and based on the metal content of said catalyst exclusive of support, of pyrophosphoric or polyphosphoric acid in free form and/or in the form of at least one salt of said metals. The catalysts may also contain small amounts of activators such as chromium, silver, palladium or ruthenium. All percentages relate to the content of the individual components determined analytically in the finished catalysts, the metals being given as such and the pyrophosphoric acids or polyphosphoric acid or their salts being given as anhydrides, i.e. independently of the actual state of combination. The catalysts may be used unsupported. In this case the individual components of the catalyst are mixed in the form of compounds which can be reduced with hydrogen at elevated temperatures, such as the oxides, hydroxides, oxalates, ammoniates or formates, with an addition of the stated amounts of the said acids which change upon heating into their pyro or poly form, heated, preferably to 300° to 700° C, and then reduced with hydrogen, advantageously at 200° to 350° C. In a preferred method of preparing the catalysts, the metals and acids are coprecipitated from a solution with sodium carbonate and the precipitate is heated, for example in a muffle furnace, at about 300° to 700° C. The mixture is powdered and press-molded into tablets or pellets and then reduced with hydrogen at elevated temperature. It is also possible to apply the metal salts and the acids to a carrier, such as fuller's earth, silicic acid, silica gel, aluminum oxide or silicates, to heat them, for example in a muffle furnace, to about 300° to 700° C and then to reduce them with hydrogen as described. It has proved to be particularly advantageous to effect precipitation of the metal components and the acids onto a powdered carrier, or to effect coprecipitation with the carrier from a solution, for example with sodium carbonate, to heat the precipitate at about 300° to 700° C for example in a muffle furnace and then to reduce it with hydrogen as described.

The process according to the invention may for example be carried out by forcing hydrogen to the point of saturation in a high pressure container into the aldehyde to be reduced in the presence of a catalyst of the said composition at the said temperature and pressure conditions. On a commercial scale the process is advantageously carried out continuously by charging a vertical high pressure tube with the catalyst, metering in aldehyde at the top and supplying hydrogen countercurrent or cocurrent under the stated conditions at the same time. In a particularly advantageous continuous method, the aldehyde is fed into the top of the high pressure tube with abouut 0.5 to 10 times the amount, preferably once to five times the amount, of hydrogenated product, with reference to the aldehyde used. A crude alcohol is obtained which is distinguished by a particularly low consumption of bromine solution. The crude alcohol is then fractionally distilled for purification. The distilled alcohols give particularly slight discolorations in a discoloration test which is carried out by heating with concentrated sulfuric acid and photometric comparison of the mixture with water which has been distilled twice.

The 2-ethylhexanol-(1) prepared by the process according to the invention is suitable as a solvent and for the production of plasticizers for plastics (cf. Ullmanns Encyclopadie der technischen Chemie (1900), volume 12, pages 30 to 32).

The invention is illustrated by the following Examples in which parts are by weight unless stated otherwise; parts by weight bear the same relation to parts by volume as the kilogram to the liter.

EXAMPLE 1

A solution of 5,640 parts of aluminum nitrate, 838 parts of nickel nitrate (6 molecules of water of crystallization), 189 parts of copper nitrate (3 molecules of water of crystallization), 36.5 parts of manganese nitrate (6 molecules of water of crystallization) and 7.1 parts of 85% by weight phosphoric acid in 20,000 parts by volume of water at 50° C is allowed to flow while stirring into a solution of 3,150 parts of anhydrous sodium carbonate in 15,000 parts by volume of water. The precipitate is filtered off by suction and washed as free as possible from sodium ions with water. The washed filter cake is dried at 110° C and then heated to 300° C. The product is powdered and moulded into pellets having a diameter of 4 mm. The pellets are charged into a vertical high pressure tube having a capacity of 1,700 parts by volume and reduced with hydrogen at 270° C. The finished catalyst contains nickel, copper and manganese in the ratio by weight of 17.0 : 5 : 0.7 and 1.2% by weight of phosphorus pentoxide with reference to nickel, copper and manganese.

345 parts by volume of 2-ethylhexen-(2)-al-(1) and 560 parts by volume of crude-2-ethylhexanol-(1) discharged from the high pressure tube are fed per hour at 160° C and under a pressure of 300 atmospheres gauge of hydrogen to the top of the high pressure tube. To remove heat, the hydrogen is recycled through a heat exchanger. 916 parts by volume per hour of crude 2-ethylhexanol-(1) is obtained which according to gas chromatographic analysis has a purity of 97.5% by weight. The yield is 99.5% of the theory with reference to 98% by weight 2-ethylhexen-(2)-al-(1). 100 g of the undistilled alcohol uses up 0.8 ml of N/1 bromine solution. The aldehyde content is 0.01% by weight. The crude 2-ethylhexanol-(1) is then fractionally distilled and the following test is carried out to determine the discoloration:

98 g of distilled 2-ethylhexanol-(1) is mixed with 7 ml of concentrated sulfuric acid and heated for 1 hour at 95° to 100° C while stirring, and then allowed to cool. The discoloration is measured against twice distilled water in a Zeiss Elko-II photometer. A photometric value of 99.5 is obtained, double distilled water giving a value of 100.

EXAMPLE 2

A solution of 3,500 parts of cobalt nitrate (6H$_2$O), 769 parts of copper nitrate (3H$_2$O), 262 parts of manganese nitrate (6H$_2$O) and 47 parts of 85% by weight phosphoric acid in 8,000 parts of water is allowed to flow into a solution of 1,700 parts of anhydrous sodium carbonate in 8,000 parts by volume of water. The precipitate is worked up as described in Example 1. The finished catalyst contains cobalt, copper and manganese in the ratio 71 : 20.0 : 5.0 and 2.9% by weight of phosphorus pentoxide with reference to cobalt, manganese and copper.

345 parts by volume of 2-ethylhexen-2-al-(1) and 860 parts by volume of crude 2-ethylhexanol-(1) are supplied at 160° C per hour under a hydrogen pressure of 300 atmospheres gauge to the top of the high pressure tube described in Example 1 which is filled with the above catalyst. The hydrogen is recycled as in Example 1. 1,216 parts by volume of the crude 2-ethylhexanol-(1) is obtained per hour; according to gas chromatographic analysis it is 96.0% by weight pure. The yield is 97.7% with reference to 98.2% by weight 2-ethylhexen-2-al-(1). 100 g of the crude 2-ethylhexanol uses up 0.6 ml N/1 bromine solution. The distilled 2-ethylhexanol-(1) has a photometric value of 99.0 after a discoloration test with sulfuric acid.

EXAMPLE 3

A solution of 864 parts of cobalt nitrate (6H$_2$O), 227 parts of copper nitrate (3H$_2$O), 46.6 parts of manganese nitrate (6H$_2$O) and 7 parts of 85% by weight phosphoric acid in 4,000 parts of water is allowed to flow while stirring at 40° C into a solution of 440 parts of anhydrous sodium carbonate in 4,000 parts by volume of water in which 812 parts of aluminum oxide is suspended. Working up is carried out as in Example 1. The finished catalyst contains cobalt : copper : manganese in the ratio by weight 17.5 : 6 : 0.7 and 1.8% by weight of phosphorus pentoxide with reference to cobalt and manganese.

2-ethylhexen-2-al-(1) is hydrogenated under the conditions given in Example 2. 1,216 parts by volume per hour of 2-ethylhexanol-(1) is obtained which after gas chromatographic analysis is 96.7% by weight pure. The yield is 98.5%. 100 g of crude 2-ethylhexanol-(1) consumes 0.8 ml of N/1 bromine solution. After distillation, the 2-ethylhexanol gives a photometric value of 99.0 in the discoloration test with sulfuric acid.

EXAMPLE 4

A solution of 502 parts of nickel nitrate (6H$_2$O), 345 parts of cobalt nitrate (6H$_2$O), 228 parts of copper nitrate (3H$_2$O), 36.6 parts of manganese nitrate (6H$_2$O) and 7.0 parts of 85% by weight phosphoric acid in 4,000 parts by volume of water is allowed to flow at 40° C while stirring into a suspension of 812 parts of aluminum oxide in a solution of 440 parts of anhydrous sodium carbonate in 4,000 parts by volume of water. The product is worked up as in Example 1. The finished catalyst contains nickel, cobalt, copper and manganese in the ratio by weight 10 : 7 : 4 : 0.6 and 1.85% by weight of phosphorus pentoxide with reference to cobalt, nickel and manganese.

2-ethylhexen-2-al-(1) is reduced under the same conditions as in Example 2. 1,216 parts by volume of crude 2-ethylhexanol-(1) is obtained per hour; according to gas chromatographic analysis it is 97.0% by weight pure. The yield is 98.9% of the theory. 100 g of the crude 2-ethylhexanol-(1) consumes 0.8 ml of N/1 bromine solution. The pure 2-ethylhexanol-(1), after distillation, has a photometric value of 99.0 in a discoloration test with sulfuric acid.

Expressed on a weight percentage basis, the metal content of the catalysts used in the foregoing examples is:

| Example | Ni | Co | Cu | Mn |
|---|---|---|---|---|
| 1 | 74.9% | 0 | 22.0% | 3.1% |
| 2 | 0 | 73.9% | 20.9% | 5.2% |
| 3 | 0 | 72.3% | 24.8% | 2.9% |
| 4 | 46.3% | 32.4% | 18.5% | 2.8% |

The copper content ranges from 18.5% to 24.8% and the manganese content ranges from 2.8 to 5.2%, with the remainder of the total of 100% being nickel and/or cobalt.

We claim:

1. A process for the production of 2-ethylhexanol-(1) which comprises contacting with hydrogen 2-ethylhexen-(2)-al-(1) dissolved in 2-ethylhexanol-(1) as the inert solvent at a pressure of 1 to 500 atmospheres gauge and a temperature of 80° to 200° C, in the presence of a hydrogenation catalyst consisting essentially of cobalt, copper and manganese wherein, based on said metals, the cobalt content is 72.3% to 73.9%, the copper content is 20.9% to 24.8% and the manganese content is 2.9% to 5.2% and 0.5 to 15% by weight, calculated as phosphorus pentoxide and based on the metal content of said catalyst exclusive of support, of pyrophosphoric acid or polyphosphoric acid in free form or partly or wholly in the form of at least one salt of said metals.

2. A process for the production of 2-ethylhexanol-(1) which comprises contacting with hydrogen 2-ethylhexen-(2)-al-(1) dissolved in 2-ethylhexanol-(1) as the inert solvent at a pressure of 1 to 500 atmospheres gauge and a temperature of 80° to 200° C, in the presence of a hydrogenation catalyst consisting essentially of nickel, copper and manganese at respective weight percentages, based on said metals, of 74.9%, 22.0% and 3.1%, and 0.5 to 15% by weight, calculated as phosphorus pentoxide and based on the metal content of said catalyst exclusive of support, of pyrophosphoric acid or polyphosphoric acid in free form or partly or wholly in the form of at least one salt of said metals.

3. A process for the production of 2-ethylhexanol-(1) which comprises contacting with hydrogen 2-ethylhexen-(2)-al-(1) dissolved in 2-ethylhexanol-(1) as the inert solvent at a pressure of 1 to 500 atmospheres gauge and a temperature of 80° to 200° C, in the presence of a hydrogenation catalyst consisting essentially of nickel, cobalt, copper and manganese in respective weight percentages, based on said metals, of 46.3%, 32.4%, 18.5% and 2.8%, and 0.5 to 15% by weight, calculated as phosphorus pentoxide and based on the metal content of said catalyst exclusive of support, of pyrophosphoric acid or polyphosphoric acid in free form or partly or wholly in the form of at least one salt of said metals.

* * * * *